Patented Nov. 27, 1934

1,982,231

UNITED STATES PATENT OFFICE 1,982,231

ASPHALTIC COATING COMPOSITION AND MATERIALS COATED THEREWITH

Arthur N. Parrett, Milwaukee, Wis., assignor to E. I. du Pont de Nemours & Company, Wilmington, Del., a corporation of Delaware No Drawing. Application November 24, 1930, Serial No. 497,837

7 Claims. (Cl. 91—70)

This invention relates to an improved asphalt varnish and to products coated therewith. More particularly this invention relates to artificial leather comprising fabrics or other flexible sheet material provided with a top coat of the improved asphalt varnish.

For many years it has been customary to finish rubber coated fabrics for use as automobile top materials with a final coat of oil varnish, but all of such materials with which I am familiar have rapidly deteriorated and quickly lost their gloss on exposure to the direct rays of the summer sun, thus rendering them prematurely unsightly and unsatisfactory.

The first successful solution of these problems was that developed by John R. Couture and disclosed and claimed in application Serial No. 122,737, filed July 15, 1926, which involved the application of a coat of asphalt varnish either directly over the rubber coated fabric or with the interposition of an intermediate coat of oil varnish. I have discovered that such materials may be further improved as will more fully appear in the following specification.

This invention has as an object the production of improved asphalt varnishes.

A further object resides in the production of an improved artificial leather or coated fabric, which is especially adapted for use as an automobile top material. Other objects will appear hereinafter.

I have discovered that the coated products of the character referred to in the previously mentioned application are improved by the addition or organic iron compounds. My improved varnish, which is of special utility as a top coating for rubber coated fabrics such as used for automobile top material, may be made by dissolving the asphalt in a suitable solvent with the aid of heat and stirring, and adding to the asphalt solution the organic iron compound dissolved in an appropriate solvent. Better results are obtained, however, by the incorporation of bodied or raw drying oils into the composition, and to this end the iron compound is added to the asphalt solution with the oil dissolved in a suitable solvent or thinner, such as turpentine. As an alternative method, however, the iron compound may be cooked into the oil prior to blending the oil with the asphaltic constituent of the varnish. This method is best suited to difficultly soluble iron salts, such as basic ferric acetate.

With the above and other objects in view, which will be apparent as the description proceeds, I have set forth my invention in the following specification and have included the following examples by way of illustration and not as a limitation.

Example 1

| | Parts by weight |
|---|---|
| Petroleum residue asphalt | 100 |
| Solvent naphtha | 100 |
| Turpentine | 20 |
| Bodied China wood oil | 17.59 |
| Iron resinate | 2.41 |
| | 240.00 |

The asphalt is heated to 500° F., allowed to cool to 425° F., an equal weight of solvent naphtha is added, and the mixture is stirred until the asphalt is completely dissolved. To this solution is added 40 parts by weight of a 50% turpentine solution of China wood oil bodied with iron resinate.

The oil used in the above varnish is prepared from the following ingredients, using the proportions indicated:

| | Parts by weight |
|---|---|
| Raw China wood oil | 87.95 |
| Iron resinate containing 7.3% iron | 12.05 |
| | 100.00 |

The China wood oil is heated to 385° F., and the iron resinate is added at this temperature, slowly and with constant stirring. The oil is then heated up to 425° F. in one hour and maintained at this temperature for 30 minutes.

Example 2

| | Parts by weight |
|---|---|
| Petroleum residue asphalt | 100 |
| Solvent naphtha | 100 |
| Turpentine | 40 |
| Bodied China wood oil | 35.55 |
| Iron oleate | 4.45 |
| | 280.00 |

The asphalt is heated to 500° F., allowed to cool to 425° F., an equal weight of solvent naphtha is added, and the mixture is stirred until the asphalt is completely dissolved. To this solution is added 80 parts by weight of a 50% turpentine solution of China wood oil bodied with iron oleate.

The oil used in the above varnish is prepared from the following ingredients, using the proportions indicated:

| | Parts by weight |
|---|---|
| Raw China wood oil | 88.86 |
| Iron oleate containing 8% iron | 11.14 |
| | 100.00 |

The China wood oil is heated to 385° F., and the iron oleate is added slowly at this temperature. The oil is then heated to 425° F. in the course of one hour and kept at this temperature for 30 minutes.

*Example 3*

| | Parts by weight |
|---|---|
| Petroleum residue asphalt | 100 |
| Solvent naphtha | 100 |
| Turpentine | 60 |
| Bodied China wood oil | 55.17 |
| Iron laurate | 4.83 |
| | 320.00 |

The asphalt is heated to 500° F., allowed to cool to 425° F., an equal weight of solvent naphtha is added, and the mixture is stirred until the asphalt is completely dissolved. To this solution is added 120 parts by weight of a 50% turpentine solution of China wood oil bodied with iron laurate (the iron salt of coconut oil acids).

The oil used in the above varnish is prepared from the following ingredients, using the proportions indicated:

| | Parts by weight |
|---|---|
| Raw China wood oil | 91.95 |
| Iron laurate containing 11.43% iron | 8.05 |
| | 100.00 |

The China wood oil is heated to 385° F., and the iron laurate is added slowly and with constant stirring. The oil is then heated to 425° F. in the course of one hour and kept at this temperature for 30 minutes.

*Example 4*

| | Parts by weight |
|---|---|
| Petroleum residue asphalt | 100 |
| Solvent naphtha | 100 |
| Turpentine | 80 |
| Bodied China wood oil | 70.96 |
| Iron linoleate | 9.04 |
| | 360.00 |

The asphalt is heated to 500° F., allowed to cool to 425° F., an equal weight of solvent naphtha is added, and the mixture is stirred until the asphalt is completely dissolved. To this solution is added 160 parts by weight of a 50% turpentine solution of China wood oil bodied with iron linoleate.

The oil used in the above varnish is prepared from the following ingredients, using the proportions indicated:

| | Parts by weight |
|---|---|
| Raw China wood oil | 84.03 |
| Iron linoleate containing 5.3% iron | 15.97 |
| | 100.00 |

The China wood oil is heated to 385° F., and the iron linoleate is added slowly and with constant stirring. The oil is then heated to 425° F. in one hour and kept at this temperature for 30 minutes.

*Example 5*

| | Parts by weight |
|---|---|
| Petroleum residue asphalt | 100 |
| Solvent naphtha | 100 |
| Turpentine | 120 |
| Bodied China wood oil | 106.63 |
| Iron naphthenate | 13.37 |
| | 440.00 |

The asphalt is heated to 500° F., allowed to cool to 425° F., an equal weight of solvent naphtha is added, and the mixture is stirred until the asphalt is completely dissolved. To this solution is added 240 parts by weight of a 50% turpentine solution of China wood oil bodied with iron naphthenate.

The oil used in the above varnish is prepared from the following ingredients, using the proportions indicated:

| | Parts by weight |
|---|---|
| Raw China wood oil | 88.86 |
| Iron naphthenate containing 8% iron | 11.14 |
| | 100.00 |

The China wood oil is heated to 385° F., and the iron naphthenate is added slowly and with constant stirring at this temperature. The oil is then heated to 425° F., in the course of one hour and kept at this temperature for 30 minutes.

*Example 6*

| | Parts by weight |
|---|---|
| Petroleum residue asphalt | 100 |
| Solvent naphtha | 100 |
| Turpentine | 160 |
| Bodied linseed oil | 140.72 |
| Iron resinate | 19.28 |
| | 520.00 |

The asphalt is heated to 500° F., allowed to cool to 425° F., an equal weight of solvent naphtha is added, and the mixture is stirred until the asphalt is completely dissolved. To this solution is added 320 parts by weight of a 50% turpentine solution of linseed oil bodied with iron resinate.

The oil used in the above varnish is prepared from the following ingredients, using the proportions indicated:

| | Parts by weight |
|---|---|
| Linseed oil | 87.95 |
| Iron resinate containing 7.3% iron | 12.05 |
| | 100.00 |

The linseed oil is heated to 450° F. and the iron resinate is added slowly and with constant stirring. The oil is then heated to 600° F. in the course of one hour and maintained at this temperature for 45 minutes.

Example 7

| | Parts by weight |
|---|---|
| Petroleum residue asphalt | 100 |
| Solvent naphtha | 100 |
| Turpentine | 344 |
| Linseed oil | 320 |
| Iron oleate | 40 |
| | 904 |

The asphalt is heated to 500° F., allowed to cool to 425° F., an equal weight of solvent naphtha is added, and the mixture is stirred until the asphalt is completely dissolved. To this solution is added 640 parts by weight of a 50% solution of linseed oil in turpentine and 64 parts by weight of a turpentine solution of iron oleate containing 5% iron.

Example 8

| | Parts by weight |
|---|---|
| Petroleum residue asphalt | 100 |
| Solvent naphtha | 100 |
| Turpentine | 120 |
| Bodied China wood oil | 105.54 |
| Iron resinate | 14.46 |
| | 440.00 |

The asphalt is heated to 500° F., allowed to cool to 425° F., an equal weight of solvent naphtha is added, and the mixture is stirred until the asphalt is completely dissolved. To this solution is added 240 parts by weight of a 50% turpentine solution of the China wood oil bodied with iron resinate, the preparation of which is described in Example 2.

Example 9

| | Parts by weight |
|---|---|
| Gilsonite | 100 |
| Solvent naphtha | 100 |
| Turpentine | 160 |
| Bodied China wood oil | 140.72 |
| Iron resinate | 19.28 |
| | 520.00 |

The gilsonite is heated to 500° F., allowed to cool to 425° F., an equal amount of solvent naphtha is added, and the mixture is stirred until the gilsonite is completely dissolved. To this solution is added 320 parts by weight of a 50% turpentine solution of China wood oil bodied with iron resinate, the preparation of which is described in Example 2.

Example 10

| | Parts by weight |
|---|---|
| Gilsonite | 100 |
| Solvent naphtha | 100 |
| Turpentine | 258 |
| Linseed oil | 240 |
| Iron oleate | 30 |
| | 728 |

The gilsonite is heated to 500° F., allowed to cool to 425° F., an equal weight of solvent naphtha is added, and the mixture is stirred until the gilsonite is completely dissolved. To this solution is added 480 parts by weight of a 50% solution of raw linseed oil in turpentine and 48 parts by weight of a solution of iron oleate containing 5% iron.

Example 11

| | Parts by weight |
|---|---|
| Petroleum residue asphalt | 100 |
| Solvent naphtha | 100 |
| Turpentine | 45.48 |
| Raw China wood oil | 40 |
| Iron resinate | 5.48 |
| | 290.96 |

The asphalt is heated to 500° F., allowed to cool to 425° F., an equal weight of solvent naphtha is added, and the mixture is stirred until the asphalt is completely dissolved. To this solution is added 80 parts by weight of a 50% solution of raw China wood oil in turpentine and 10.96 parts by weight of a 50% turpentine solution of iron resinate containing 3.66% iron.

Example 12

| | Parts by weight |
|---|---|
| Petroleum residue asphalt | 100 |
| Solvent naphtha | 100 |
| Turpentine | 80 |
| Linseed oil | 80 |
| Iron ricinoleate | 20 |
| | 380 |

The asphalt is heated to 500° F., allowed to cool to 425° F., an equal weight of solvent naphtha is added, and the mixture is stirred until the asphalt is completely dissolved. To this solution is added 160 parts by weight of a 50% solution of raw linseed oil in turpentine and 20 parts by weight of a 50% turpentine solution of iron ricinoleate containing 4% iron. By iron ricinoleate I mean the iron salt of castor oil acids.

Example 13

| | Parts by weight |
|---|---|
| Petroleum residue asphalt | 100 |
| Solvent naphtha | 220 |
| Toluol | 62.51 |
| Linseed oil | 120 |
| Ferric butyl phthalate | 26.29 |
| | 528.80 |

The asphalt is heated to 500° F., allowed to cool to 425° F., an equal weight of solvent naphtha is added, and the mixture is stirred until the asphalt is completely dissolved. To this solution is added 240 parts by weight of a 50% solution of raw linseed oil in solvent naphtha and 88.8 parts by weight of a 29.6% toluol solution of ferric butyl phthalate containing 1.35% iron.

Example 14

| | Parts by weight |
|---|---|
| Petroleum residue asphalt | 100 |
| Solvent naphtha | 100 |
| Turpentine | 40 |
| Bodied China wood oil | 36.07 |
| Iron tungate | 3.93 |
| | 280.00 |

The asphalt is heated to 500° F., allowed to cool to 425° F., an equal weight of solvent naphtha is added, and the mixture is stirred until the asphalt is completely dissolved. To this solution is added 80 parts by weight of a 50% turpentine solution of China wood oil bodied with iron tungate (the iron salt of China wood oil acids).

The oil used in the above varnish is prepared from the following ingredients, using the proportions indicated:

|  | Parts by weight |
|---|---|
| Raw China wood oil | 90.17 |
| Iron tungate containing 9.18% iron | 9.83 |
|  | 100.00 |

The China wood oil is heated to 385° F. and the iron tungate is added at this temperature, slowly and with constant stirring. The oil is then heated to 425° F. in one hour and maintained at this temperature for 30 minutes.

The iron tungate referred to above may be defined as a compound prepared by reacting ferrous or ferric salts of iron with tung oil acids or their salts.

The varnishes set forth above, as well as other varnishes falling within the scope of the present invention, are highly useful in finishing rubber coated fabrics, and particularly those to be used as automobile top materials. In the manufacture of such materials the varnish may be applied either as a single coat directly over the rubber coated fabric, or it may be applied as the final coat in a two coat system in which the intermediate coat is preferably a long oil varnish. However, other intermediate varnishes, such as suitable asphalt varnishes, have been used with excellent results.

An example of an oil varnish suitable as an intermediate coating between the rubber and asphalt coatings is as follows:

*Example 15*

|  | Parts by weight |
|---|---|
| Carbon black | 2.5 |
| Bodied China wood oil with drier | 20.0 |
| Bodied linseed oil and drier | 20.0 |
| Petroleum residue asphalt | 3.5 |
| Turpentine substitute | 54.0 |
|  | 100.0 |

In the one-coat system, which is the simplest form of my invention, the coat of asphalt varnish is applied over the uncured rubber and then subjected to heating at a suitable temperature and for a sufficient time to vulcanize the rubber and to thoroughly fuse the asphalt film. By this treatment I obtain on the surface of the goods a smooth, continuous film which is substantially inert and which remains for a long time unaffected by sunlight. The temperature and time of cure depend on the rubber compound, and especially on the kind and quantity of vulcanizing agent used. As a rule, the temperature will lie between 240 to 275° F., and the time of cure will be from 30 minutes to 3 hours.

When using my two-coat system, I first apply over the uncured rubber an intermediate coat of varnish, such as an oil varnish. This coat may be "air-dried", if desired, that is, dried at room temperature, but it is more advantageous from the cost standpoint to use a "force-dry", that is, dry at an elevated temperature, but below the vulcanizing temperature. Thus, I usually dry the first coat varnish by heating it up to 250 to 270° F. in one hour, after which I apply the final asphalt varnish and finish by baking at a temperature of about 240° to 275° F. for such time as is required to complete the vulcanization of the rubber.

In some cases it is advantageous, after applying the intermediate varnish coat, to bake at the vulcanizing temperature for a portion of the vulcanizing period and to complete the vulcanization of the rubber by baking at the same temperature after the final coat of asphalt varnish has been applied. This procedure somewhat shortens the total time required to complete the process, but it is important that care should be taken on the one hand to avoid overvulcanization of the rubber, and on the other hand that the final coat should receive not less than about one hour's treatment at the full vulcanizing temperature in order to produce the best results and to properly condition the asphalt varnish film. However, I do not wish to limit my invention to a process which involves baking the final asphalt coat of a two-coat system, since good results may be obtained with a two-coat system of which the first coat is a baked oil varnish and the second coat an air-dried asphalt varnish.

The two-coat system is preferred to the one-coat system, especially over a rubber coated fabric, because it has greater flexibility and retains its gloss for a longer time. Without limiting myself thereto, I believe this is due to the elastic coat of intermediate varnish acting as a buffer or bridge between the extremely elastic rubber compound and the comparatively inelastic asphalt varnish film.

While asphaltic materials from various origins are suitable for the purposes of the present invention, I prefer to use a petroleum residue asphalt which has been steam refined, as distinguished from petroleum residue asphalt which has been refined by other methods, as for instance, by blowing with air. The characteristics desired in the asphalt depend somewhat, however, on the manner in which the varnish is to be applied and dried. When the varnish is to be baked at the temperature used to vulcanize the rubber, as is the preferred practice, I prefer to use a steam refined petroleum residue asphalt having a softening point between the approximate range of 150–250° F. as determined by the ball and ring method described in A. S. T. M. standards, 1921, page 944, under the serial designation D—36—21. It is desirable, furthermore, that the steam refined petroleum residue asphalt have as high a melting point as possible within the range given in order to obtain with this type of asphalt the maximum durability and retention of luster on exposure to the weather. For varnishes which are to be air-dried or baked at lower temperatures, as temperatures lower than required for vulcanization of the rubber, harder asphalts should be used, the preferred being petroleum residue asphalts prepared by steam refining processes which melt about 200° F., as determined by the ball and ring method previously referred to. Among other asphalts especially suitable for varnishes to be air-dried or baked at low temperatures may be mentioned Gilsonites and other natural bitumens.

Other suitable drying oils, such as perilla or soya bean oil, may be used instead of those mentioned in the examples. In general, raw or bodied oils may be employed, but when China wood oil is employed in other than very short gallon lengths, care must be taken to "cure" or "body" it sufficiently to prevent wrinkling, as is well known in the varnish art. The purpose in using the drying oil is to decrease the brittleness of the asphalt when it is spread in a thin film. From 2½ to 7½ gallons of oil to 100 lbs. of asphalt is generally sufficient for this purpose, but in some cases where a high degree of elasticity is desired I may use with good results as high as 15 or even 30 gallons of oil per 100 lbs. of asphalt. My preferred compositions, however, contain less oil than asphalt. Pigments, fillers, or toughening agents, such as carbon black may be ground with the oil before mixing with the asphalt where it is desired to toughen the film or to obtain additional protection against sunlight. The term "gallon" is used herein in accordance with the general usage in the varnish trade as designating a weight of 8 pounds of oil per 100 pounds of gum, the gum in the present instance being asphalt. For example a five gallon asphalt-oil varnish contains approximately forty parts by weight of oil to one hundred pounds of asphalt.

The iron compounds may be dissolved in suitable thinners or solvents or they may be cooked into the oil prior to blending the oil with the asphalt. While a wide variety of iron organic compounds may be employed, I prefer to use the iron salts, either ferrous or ferris, of such acids as abietic acid, oleic acid, linseed oil acids, China wood oil acids, and similar compounds because these materials are easily prepared either by precipitating or fusion processes.

Whereas I have specified the addition of iron organic compounds, it will be apparent that the iron organic compounds may also be formed in situ by cooking some iron inorganic compounds with the constituents of the varnish.

While I prefer to use enough iron compound so that the system contains about 1% iron, based on the oil content of the varnish, good results are obtained if this amount is varied, for example between 0.5% and 4.0%. However, quantities larger than 1.0% are not especially advantageous except in difficultly compatible systems.

While driers are sometimes desirable in my improved asphalt coatings containing drying oils, it is to be understood that the invention resides, not in the use of these iron compounds as driers, but in the discovery that the iron compounds impart improved properties to the asphalt coatings especially with respect to longer retention of the luster of the finish. In my preferred composition containing drying oils these improved properties are due chiefly to my discovery that the incorporation of the organic iron compounds causes superior blending of the asphalt and oil into a homogeneous system, as compared to the blending effect produced by other metallic compounds which function as driers. It will be seen, therefore, that with respect to the main object of the invention, the drying function of the iron compounds is incidental, because the drying function, if absent from the particular organic iron compound used, could be supplied by the addition of any of the known driers other than an iron compound. The blending power of iron compounds is evidenced by the large quantity of drying oil that may be incorporated into the asphalt-drying oil varnish when the organic iron compounds are used, as compared to the quantity that may be incorporated when other metallic driers are used. Forty gallon asphalt-bodied China wood oil (320 lbs. oil per 100 lbs. asphalt) varnishes have been prepared with the iron compounds herein disclosed whereas satisfactory varnishes exceeding 25 gallons in oil length (200 lbs. oil per 100 lbs. asphalt) cannot be made with other metal driers.

Exposure tests of material finished with asphalt-oil varnishes containing organic salts of iron and similar asphalt varnishes containing metallic driers other than from salts, show conclusively the beneficial effects of the iron compound by the better retention of luster and the lesser tendency of the coating to check and to show separation of the components of the coating. The superior luster retaining properties of my improved coated materials appears also to be due partly to the power of the iron compounds to retard or absorb the ultraviolet rays present in sunlight and thereby shield the coating from their destructive effect. In this connection attention is directed to the fact that varnishes containing no oil, as the varnish of Example 1, yield coatings of longer retention of luster than a similar varnish in which the iron compound is replaced by salts of metals other than iron.

Various other solvents, such as mineral spirits, benzene, and toluene, may be used for dissolving the asphalt, as will be understood by those skilled in the art. The solvent selected should preferably be one in which the organic iron compound is soluble, and these compounds are soluble in the usual asphalt solvents such as those mentioned above. Since the organic iron compounds are very easily soluble in turpentine, it is preferred first to dissolve the iron compound in turpentine and then to add this solution to the asphalt solution.

It will, therefore, be apparent that I have developed new and useful coated fabrics which possess improved capability of retaining a high luster over a long period of time as compared with materials heretofore available, and new and useful processes for producing same. While said processes and coated fabrics have been described in connection with rubber coated fabrics, since these represent the preferred embodiments of my invention, it is apparent that the finishes disclosed herein may be applied as a top coat to flexible sheet material in general, such as fabrics or leather. My improved asphalt coating composition may also be used for the production of artificial leather by finishing coated materials other than rubber coated materials, such as nitrocellulose coated and linseed coated fabrics.

As many apparently widely different embodiments of this invention may be made without departing from the spirit and scope thereof, it is to be understood that I do not limit myself to the specific embodiments thereof except as defined in the appended claims.

I claim:

1. A process for making artificial leather which comprises applying over a rubber coated fabric sheeting a varnish coating comprising drying oil, asphalt, a solvent for the asphalt, an organic iron compound soluble in said solvent, and baking the resulting product, the organic iron compound being present in such an amount to increase the compatibility of the asphalt with the oil so that 100 pounds of the asphalt may be mixed in homogeneous blend with at least 320 pounds of the oil.

2. As an article of manufacture a rubber coated flexible fabric sheeting having a final coat of dried varnish comprising drying oil asphalt and an organic iron compound soluble in organic varnish solvents, the organic iron compound being present in such an amount to increase the compatibility of the asphalt with the oil so that 100 pounds of the asphalt may be mixed in homogeneous blend with at least 320 pounds of the oil.

3. The process set forth in claim 1 in which said organic iron compound is present in the varnish in an amount equal to from 0.5% to 4% iron based upon the weight of the drying oil present in the varnish.

4. The process set forth in claim 1 in which said organic iron compound is present in an amount equal to about 1% iron based upon the weight of the drying oil present in the varnish.

5. The process set forth in claim 1 in which said organic iron compound is a salt of an acid selected from the class consisting of fatty acids, abietic acid, naphthenic acid, and half acid esters of polybasic acids.

6. The article set forth in claim 2 in which said organic iron compound is a salt of an acid selected from the class consisting of fatty acids, abietic acid, naphthenic acid, and half acid esters of polybasic acids.

7. The article set forth in claim 2 in which the organic iron compound is present in the final coat of dried varnish in an amount equal to from 0.5% to 4% iron based upon the weight of the drying oil present.

ARTHUR N. PARRETT.